United States Patent
Wang et al.

(10) Patent No.: US 8,538,146 B2
(45) Date of Patent: Sep. 17, 2013

(54) METHOD AND DEVICE FOR COLOR CORRECTION

(75) Inventors: Jian Wang, Beijing (CN); Lei Yao, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 78 days.

(21) Appl. No.: 13/255,954

(22) PCT Filed: Mar. 12, 2010

(86) PCT No.: PCT/CN2010/000303
§ 371 (c)(1),
(2), (4) Date: Nov. 23, 2011

(87) PCT Pub. No.: WO2010/102519
PCT Pub. Date: Sep. 16, 2010

(65) Prior Publication Data
US 2012/0099789 A1 Apr. 26, 2012

(30) Foreign Application Priority Data

Mar. 12, 2009 (CN) .......................... 2009 1 0079836

(51) Int. Cl.
*G06K 9/00* (2006.01)
(52) U.S. Cl.
USPC ...................................................... 382/167
(58) Field of Classification Search
USPC .......... 382/167, 162, 176, 274, 313; 358/1.9;
345/601, 660; 348/222.1
See application file for complete search history.

(56) References Cited

U.S. PATENT DOCUMENTS

| | | | | |
|---|---|---|---|---|
| 7,860,339 | B2 * | 12/2010 | Yamashita et al. | 382/274 |
| 8,165,417 | B2 * | 4/2012 | Yamashita et al. | 382/274 |
| 2007/0103601 | A1 | 5/2007 | Izumi | |
| 2007/0211315 | A1 | 9/2007 | Fuji | |

FOREIGN PATENT DOCUMENTS

| | | |
|---|---|---|
| CN | 1964431 A | 5/2007 |
| CN | 101035190 A | 9/2007 |
| CN | 101365043 A | 2/2009 |
| CN | 101527779 A | 9/2009 |

\* cited by examiner

*Primary Examiner* — Anh Do
(74) *Attorney, Agent, or Firm* — The Webb Law Firm

(57) ABSTRACT

The present invention discloses a method and a device for color correction for solving a problem of low color correction processing speed for images input into a computer in the prior art. A main technical solution includes: an input image is divided into no less than one image blocks; various color component values of all pixels in each image block are compared with each other, an image block with the same color component values of all pixels being regarded as a simple block, and an image block with different color component values being regarded as a complex block; and a process of color correction is performed on one pixel of the simple block, then the color correction processing result is copied to other pixels of the simple block. With the technical solution, an object of increasing processing speed can be achieved by performing simplified processing directly toward certain image parts with special features, and the color correction processing speed can be increased without general influence on the present color correction effect.

10 Claims, 2 Drawing Sheets

METHOD AND DEVICE FOR COLOR CORRECTION

TECHNICAL FIELD OF THE INVENTION

The present invention relates to a technical field of computer image processing, more particularly to a method and device for color correction.

BACKGROUND OF THE INVENTION

Computer image color correction is an image processing employed for eliminating a difference in output features for the same image between different output devices (such as a display screen and a printer). The core technology of computer image color correction is to achieve a consistent output (color) effect which closes to a manuscript as much as possible. The difference in output features between different output devices results in colors output by different output devices belonging to different color spaces. In fact, a process of color correction is mainly a process of transforming an image in one color space (a color space of the manuscript, original color space) into another color space. Features of different color spaces are generally described with industrial standards specified by International Color Consortium (ICC), which are referred to as ICC Profile.

In general, the process of color correction for an output device is shown in FIG. 1, comprising the following steps:

Step 1, Color Adjustment

This step is provided mainly for compensating a difference between the original color space and an ICC profile describing the original color space. Of course, in practice, this step may also be used for compensating a difference between a color space of a device and an ICC profile describing the color space of the device, or for simply making a certain special processing for an image, for example, increasing Magenta component among Cyan (C), Magenta (M), Yellow (Y), and Black (K) components of the whole image.

Step 2, Color Space Transformation

This step is a core step of the whole process of color correction, and it needs to transform an image in the original color space into an image with the same or a similar visual effect under the color space of the device pixel by pixel in accordance with features of the original color space and the color space of the device. See the following representation of pseudo codes:

```
Res = ICC_Convert([in]srcICC, [in]desICC, [in]src, [out]des, [in]
    num)
// ICC_Convert is a function for color space transformation
// Res represents a result of the transformation process, for
    example, succeed or fail
// srcICC represents an ICC profile describing the original color
    space
// desICC represents an ICC profile describing the color space of
    the device
// src is a pointer pointing to a data buffer of an image under
    srcICC color space
// des is used for output, and is a pointer pointing to a buffer of the
    transformed image
// num represents the number of pixels which needs transforming
```

Sometimes in order to speed up, srcICC and desICC may be combined as one file to guide the transformation process of two color spaces, and the combined file is referred to as DeviceLink. By using DeviceLink, above pseudo codes become:

Res=ICC_Convert([in]src_des_Link, [in]src, [out]des, [in]num);

Wherein, src_des_Link represents DeviceLink from the original color space to the color space of the device.

Step 3, "Black"/"Gray"/"Solid Color" Sets Reservation

Under CMYK color space, "black" has two kinds of definitions:

a) a value of black component is 100% and other color component values are 0, that is, k=100%=1, c=0, m=0 and y=0; or b) the value of black component being 100% is enough, that is, k=100%.

"Black" reservation means that if a color value of a certain pixel of an original image satisfies the above definitions of black, regardless of what the color value becomes after the color space transformation, the value returns to a standard black value (c=0, m=0, y=0 and k=1).

Under CMYK color space, a definition of "gray" is that except k color component, other color components are equal and they are 0, that is, c=m=y=0.

"Gray" reservation means that if a color value of a certain pixel of an original image satisfies the above definition of gray, regardless of what the color value becomes after the color space transformation, the value returns to the color value before the color space transformation.

Under CMYK color space, a definition of "solid color" is that except one color component, other color components are all 0.

"Solid color" reservation means that if a color value of a certain pixel of an original image satisfies the above definition of solid color, regardless of what the color value becomes after the color space transformation, the value returns to the color value before the color space transformation.

Such a step exists in the process of color correction for two main reasons: a) Regardless of "black", "gray" or "solid color", there may be a situation that color component values are not 0 after performing the color space transformation, resulting in "degradation" visually.

b) A function of color space transformation generally does not have such a function, so it needs correcting the color values of pixels which should not be transformed after the image is transformed.

Step 4, Total Volume of Ink Controlling

Different kinds of paper are very different in absorbency of different kinds of ink. If the sum of various color component values is over huge at one position (pixel), the volume of ink will exceed the absorbency of the paper, resulting in flow or that the ink can not be attached to an output medium, and the output effect of the whole image is damaged finally.

Total volume of ink controlling is a method applied for reducing various color component values when the sum of various color component values of a certain pixel exceeds a certain threshold. A function of total volume of ink controlling will be explained in a method of proportionally reducing various color component values as follows:

```
// first, calculating the total volume of ink
sum = c + m + y + k ;
if (sum > Threshold)
{
    // if the total volume of ink exceeds the threshold, reducing
        various color component values proportionally
    c = c * Threshold / sum;
    m = m * Threshold / sum;
    y = y * Threshold / sum;
    k = k * Threshold / sum;
}
```

It should be noted that the method of reducing various color component values proportionally is only one of the methods for total volume of ink controlling.

Step 5, Linearization

In general, most of output devices can not accurately represent input color values. For example, when a Color Inkjet Printer printing a color block of 50% solid cyan color (the color values are c=0.5, m=0, y=0 and k=0), an actual output measuring value of cyan is generally 70% or higher. In this case, in order to achieve 50% output value of cyan, the input cyan needs adjusting.

For example, the output effect of 50% input value is 70%; in order to achieve 50% output effect, the input value is changed into 33%.

Step 6, Dithering.

Sometimes there is an area where a color is uniformly transited into another color in an image. Actually, it is a teeny and regular change in color values between adjacent pixels in a certain direction.

However, due to the aforementioned processing steps, the uniformity of color transition will be damaged. At this time, during the process of color gradually transiting, a relatively huge change in color values between adjacent pixels will occur, resulting in "degradation" visually.

Dithering is used for getting rid of the bad visual effect, and the method used is obscuring a boundary where a sudden change occurs.

As total volume of ink controlling, there are many methods for dithering. One of the methods and its function will be illustrated as follows:

```
// sizeofImage represents the number of image pixels
for ( int i = 0; i < sizeofImage; i++)
{
    // image represents image data including four components:
    // CMYK. A range of each component is 0-255.
    // DT represents dithering table, each value of the table also
    // includes four components, and a range of each
    // component is also 0-255.
    // sizeofDT represents a size of the dithering table, in order to
    // avoid repetition at utmost, sizeofDT is a prime in general.
    if (image[i].c > 0 && image[i].c < 255)
        // % represents an operation of congruence
        image[i].c += image[i].c > DT[i%sizeofDT].c;
    if (image[i].m > 0 && image[i].m < 255)
        image[i].m += image[i].m > DT[i%sizeofDT].m;
    if (image[i].y > 0 && image[i].y <255)
        image[i].y += image[i].y > DT[i%sizeofDT].y;
    if (image[i].k > 0 && image[i].k < 255)
        image[i].k += image[i].k > DT[i%sizeofDT].k;
}
```

It can be seen from the above method, by way of randomly increasing or decreasing the values of various components of each pixel of the input image, an effect of obscuring a boundary where the sudden change occurs can be achieved.

While only six steps in the process of computer image color correction are listed above, there may be more steps in practice, and an order of steps in the process is not fixed.

It can be seen from the above steps in the process of color correction, a common method of color correction needs to take multiple steps and a pixel-by-pixel process to the original image, and the amount of computation is very huge. Especially when an input image having a high resolution and a large size, the processing speed becomes a huge bottleneck, and a demand for high-speed output devices can not be met.

SUMMARY OF THE INVENTION

The present invention provides a method and a device for color correction to solve the problem that low processing speed of color correction for computer images can not meet a demand for high-speed output devices in the prior art.

Embodiments of the present invention are implemented by providing the following technical solutions:

An embodiment of the present invention provides a method of color correction, comprising:

dividing an input image into no less than one image blocks;

in each image block, comparing various color component values of all pixels with each other, the image block with the same color component values of all pixels being regarded as a simple block, and the image block with different color component values being regarded as a complex block;

performing a process of color correction on an pixel of the simple block, then copying the processing results of the color correction to other pixels of the simple block.

Another embodiment of the present invention provides a device for color correction, comprising a dividing unit, a determining unit, a processing unit, and a storage unit, wherein:

the dividing unit is used for dividing an image into image blocks, and sending the data of the image blocks to the determining unit and the processing unit;

the determining unit is used for determining whether various color component values of all pixels in a image block are equal, and further for determining whether the color component values of the next pixel in a complex block equal to the color component values of a previous pixel stored in the storage unit;

the processing unit is used for processing color correction on pixels and storing processing results of the color correction in the storage unit;

the storage unit is used for storing the processing results of the color correction on pixels and sending the results to the determining unit.

With the technical solution above, a goal of increasing processing speed can be achieved by performing simplified processing for certain image parts with special features, and the processing speed of the color correction can be increased without substantially influencing the present color correction effect.

DETAILED DESCRIPTION OF THE PREFERRED EMBODIMENTS

In order to increase processing speed of color correction for computer image, the present invention provides a method of color correction. Main principle, particular process and advantageous effects that should be achieved by embodiments of the present invention will be described in detail with reference to the drawings.

In an embodiment of the present invention, a computer image is divided into several smaller image blocks, if various color component values of all pixels in an image block are equal, only one pixel needs color correction processing, and the processing result of the color correction is suitable for other pixels in the image block; on the other hand, if the values are not equal, color component values and the color correction processing result of a previous pixel or a previous row/column of pixels are cached, and if color component values of the next pixel or the next row/column of pixels are equal to the color component values of the previous pixel or the previous row/column of pixels, the processing result of the color correction on the previous pixel or the previous row/column of pixels is suitable for the next pixel or the next row/column of pixels.

Figure 1:
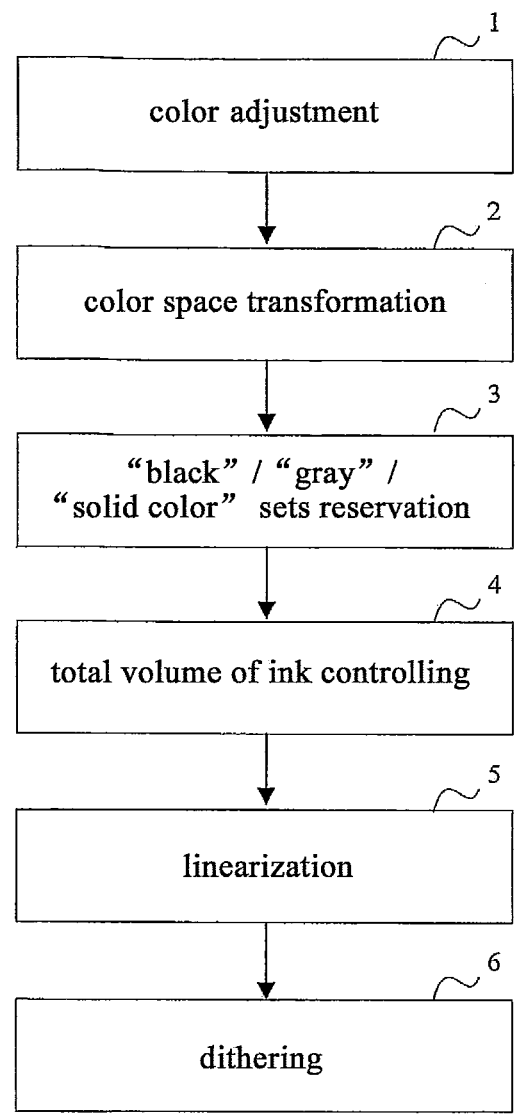
FIG. 1 is a flowchart of image color correction in the prior art.
Figure 2:
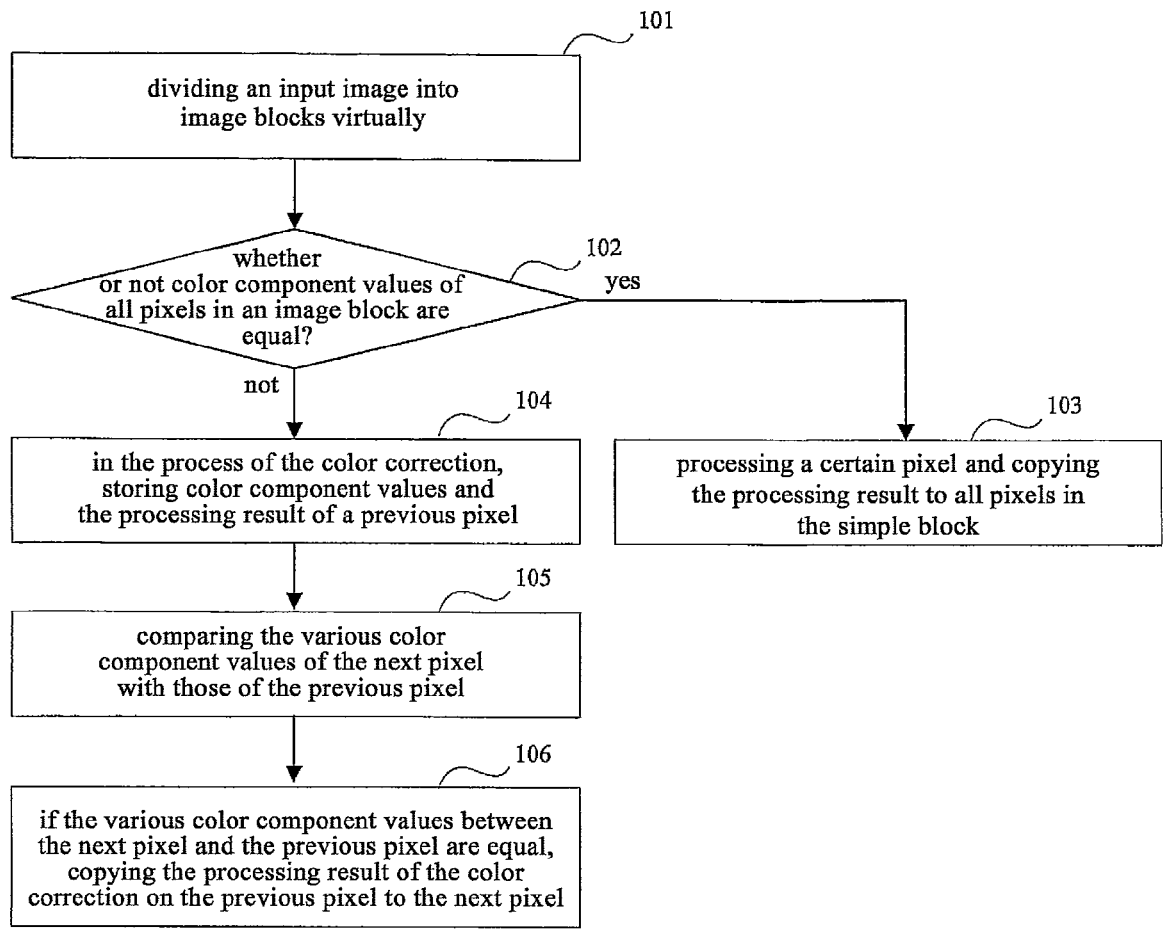
FIG. 2 is a flowchart of processing color correction for an input computer image in accordance with an embodiment of the present invention.

In an embodiment, a particular process of color correction applied to an input computer image as shown in FIG. 2, comprising the following steps:

Step 101, the input image is virtually divided into image blocks with a width of m pixels and a height of n pixels. In order to achieve a better effect, the value of m may be equal to the value of n and both of them are power of 2. At this time, values of the same color surface of a plurality of pixels or values of different color surfaces of one pixel may be combined into a large unit to compare, so that times of comparing can be reduced effectively.

Step 102, if all color component values of all pixels in an image block are equal, that is, the image block is composed of pixels with a single color, such an image block is a simple block; otherwise, the image block is not a simple block, and it is referred to as a complex block. Finally, the detection result is recorded.

Here is an example of an image data stored in color surfaces, effect of the whole detection process of a simple block is described by way of pseudo codes:

```
// traversing the whole image in a height direction, wherein the
    height means a height of the whole image
// the unit is pixel
for (int i = 0; i < (height+n-1)/n; i ++)
// traversing the whole image in a width direction, wherein the
    width means a width of the whole image
// the unit is pixel
for (int j = 0; j < (width+m-1)/m; j ++)
{
    // SignBlock represents whether the current image block is a
        simple block, the default is set to a simple block
    SignBlock[i][j] = TRUE;
    // w represents an actual width of the image block in unit of
        pixel
    int w = m;
```

-continued

```
// h represents an actual height of the image block in unit of
    pixel
int h = n;
// the width of image blocks in the rightmost column may be
    less than m, deal with this situation
        if (width – j * m < m)      w = width – j * m;
// the height of image blocks in the lowest row may be less
    than n, deal with this situation
```

-continued

```
        if (height – i * n < n)      h = height – i * n;
    BOOL bIsSimpleBlock = TRUE;
    // pC points to cyan version data of a pixel at the upper left
        corner of the input image, p points to cyan version data
        of a
    // pixel at the upper left corner of a image block at the i$^{th}$ row
    // and the j$^{th}$ column
    p = pC + i * width * n + j * m;
    // traversing the whole image block
    for (int y = 0; y < h; y++)
    for (int x = 0; x < w; x++)
    // determining whether cyan version data of the image block is
        equal to the cyan version data of the pixel at the upper left
        corner of the image block
            if (p[0] != p[y*height+x])
            {
                // determining that this image block is not a
                simple
                    block, break from the loop
                bIsSimpleBlock = FALSE;
                break;
            }
    // if it is determined that the current image block is not a
        simple block, start to determine the next block
    if (bIsSimpleBlock == FALSE )
    {
        SignBlock[i][j] = FALSE;
        continue;
    }
    // starting to review magenta version
    ...
    // starting to review yellow version
    ...
    // starting to review black version
    ...
}
```

If the image data is stored in pixels, the above process may need changing accordingly. The meaning of SignBlock can be seen in Table 1. In the table, TRUE represents that a specified image block is a simple block, and FALSE represents that a specified image block is not a simple block.

TABLE 1

| Position | 0 | 1 | 2 | 3 | 4 | 5 | 6 | 7 | 8 |
|---|---|---|---|---|---|---|---|---|---|
| 0 | TRUE | TRUE | FALSE | FALSE | FALSE | FALSE | TRUE | TRUE | TRUE |
| 1 | TRUE | TRUE | TRUE | TRUE | TRUE | TRUE | TRUE | TRUE | TRUE |
| 2 | TRUE | FALSE | FALSE | FALSE | FALSE | FALSE | FALSE | TRUE | TRUE |
| 3 | TRUE | FALSE | FALSE | FALSE | FALSE | FALSE | FALSE | TRUE | TRUE |
| 4 | FALSE | FALSE | FALSE | FALSE | FALSE | FALSE | FALSE | FALSE | FALSE |
| 5 | TRUE | FALSE | FALSE | FALSE | FALSE | FALSE | FALSE | FALSE | TRUE |
| 6 | TRUE | FALSE | FALSE | FALSE | FALSE | FALSE | FALSE | FALSE | TRUE |
| 7 | TRUE | FALSE | FALSE | FALSE | FALSE | FALSE | FALSE | FALSE | TRUE |

In order to make the present invention have a better effect, adjacent simple blocks with the same color value may be combined into a large simple block. Similarly, adjacent complex blocks may be combined into a large complex block. In this way, the number of blocks of the whole image may be reduced, and the processing speed may be increased. For example, the image blocks shown in Table 1 may be combined into the image blocks in Table 2.

TABLE 2

| Position | 0 | 1 | 2 | 3 | 4 | 5 | 6 | 7 | 8 |
|---|---|---|---|---|---|---|---|---|---|
| 0 | TRUE | | | | FALSE | | | | TRUE |
| 1 | | | | | TRUE | | | | |
| 2 | TRUE | | | | FALSE | | | | TRUE |
| 3 | | | | | | | | | |
| 4 | | | | | FALSE | | | | |
| 5 | TRUE | | | | FALSE | | | | TRUE |
| 6 | | | | | | | | | |
| 7 | | | | | | | | | |

Step 103, for the simple blocks, steps 1-5 in the process of the color correction of the prior art can be simplified significantly. There is no need to complexly calculate pixel-by-pixel. Only a certain pixel needs calculating, and the calculating result can be copied to all pixels of the simple block after all processing is finished.

Since the process of dithering will cause a simple block no longer to be a simple block, in order to make the present invention have a better effect, the simple blocks may not be involved into the process of dithering, that is, during the process of dithering, all component values of all pixels in a simple block stay constant.

Step 104, for the complex blocks, color component values and the processing result of a previous pixel are stored during the process of the color correction.

Step 105, the various color component values of the next pixel are compared to those of the previous pixel.

Step 106, if the various color component values of the next pixel are equal to those of the previous pixel, no process is needed, and the stored processing result of the color correction on the previous pixel is directly copied.

Here is an example of a process of total volume of ink controlling by proportionally reducing color components, and an effect of above buffering technique is described by way of pseudo codes, wherein prevDot represents color values of a previous pixel before the process, procDot represents processed color values of the previous pixel, and p is a pointer pointing to color values of the current pixel, which is assumed to be stored in pixels.

```
if (p[0] == prevDot)
    // if the color values of the current pixel are consistent with
        the color values of the previous pixel before the process,
    // the buffered result after the process is assigned directly;
    p[0] = procDot;
else
{
    // recording color values of the current pixel
    prevDot = p[0];
    int sum = p[0].c + p[0].m + p[0].y + p[0].k;
    if (sum > Threshold)
      {
        p[0].c = p[0].c * Threshold / sum;
        p[0].m = p[0].m * Threshold / sum;
        p[0].y = p[0].y * Threshold / sum;
        p[0].k = p[0].k * Threshold / sum;
      }
    // recording processed color values of the current pixel
    procDot = p[0];
}
```

The above method is a buffer applied for a single pixel, so it is referred to as a point buffer. Due to a strong relativity between adjacent pixels in an image, the solution of the point buffer reduces complex calculation, and makes a good effect of speeding up.

As a special example of the point buffer, a line buffer method may also be applied. The line buffer method means that color component values and the processing result of a previous row/column of pixels are stored during the process of the color correction; in this way, a pixel in the next row/column with the same color component values as those of a pixel in the previous row/column at the same position does not need processing, and the stored processing result of the color correction on the pixel in the previous row/column is directly copied to the pixel in the next row/column at the same position.

Here is an example of steps of color space transformation in the process of the color correction, and an effect of the line buffer method is described by way of pseudo codes. Wherein prevLine represents color values of the previous row/column of pixels before the process, procLine represents processed color values of the previous row/column of pixels, p is a pointer pointing to color values of the first pixel in the current row/column which is assumed to be stored in pixels, and w is the width of the current image.

```
int index = 0;
for (int i = 0; i < w; i ++)
{
    // if values of a pixel are equal to those of the pixel in the
        previous row/column at the same position, the processed
        color values are directly copied
    if (p[i] == prevLine[i])
        p[i] = procLine[i];
    else
    {
        // recording values of the current pixel (before the
            process)
        prevLine[i] = p[i];
        // if values of the pixel are not equal to the pixel
            in the previous row/column at the same position,
            the position is recorded in pos
        // the color values of the current pixel is copied to a
            temporary buffer src
        pos[index] = i;
        src[index] = p[i];
        index ++;
    }
}
// performing ICC conversion, please be noted that the index is
    never greater than w
ICC_Convert (srcICC , desICC , src , src , index);
// transferring the converted result to the same position in a
    row/column of the input image as that of procLine
for (i = 0; i < index; i ++)
{
    p[pos[i]] = src[i];
}
// recording the position of the current row/column after the
    process and using it at the time of processing the next row/column
procLine = p;
```

Further, if the relativity between the two adjacent rows/columns is small during the process of comparing, abandon the comparing and directly process the current row/column of pixels; however, the good environment (prevLine and procLine) needs reserving so that it can be used at the time of processing the next row/column. If there are three rows of image data, the relativity between the first row and the second row is small, but the relativity between the second row and the third row is large (such a situation is common in data image). The process is in such a way: after detecting that the relativity between the first row and the second row is small, an optimized process of the color correction is no longer performed to the second row of data. At this time, prevLine is very likely unchanged (pointing to the image data in the first row). However, prevLine must point to the image data in the second row before processing the third row of image. In this way, the relativity between the second row and the third row may be used when processing the image data in the third row. See the following schematic codes:

```
CopyMemory (prevLine, p, sizeof(prevLine));
// performing ICC conversion
ICC_Convert (srcICC, desICC, p, p, w);
procLine = p;
```

The same as the point buffer method, the line buffer method can effectively use the strong relativity between adjacent pixels in an image to achieve the goal of reducing the amount of computation.

In order to make the present invention have a better effect, after the detecting step of the simple block, if the input image data is not stored in pixels, the image is rearranged to be stored in pixels. The reason for arranging it after detecting the simple block is that there is no need to store a simple block in pixels. In other words, performing rearrangement is only applied to complex blocks. The effect of the method is shown in the following pseudo codes:

```
// first, determining whether the current image block (the i^th row
    and the j^th column) is a complex block
if (SignBlock[i][j] != TRUE)
{
        // w and h are width and height of the current image block
            respectively
        for (int x = 0; x < h; x++)
        for (int y = 0; y < w; y++)
        {
            // pC, pM, pY, pK are respectively pointers pointing to
                pixels at upper left corners of various color versions
                (CMYK) of the current image block, and
            // width represents the width of the whole image
            pNew[x][y].c = pC[x * width + y];
            pNew[x][y].m = pM[x * width + y];
            pNew[x][y].y = pY[x * width + y];
            pNew[x][y].k = pK[x * width + y];
        }
}
``` pNew is a pointer pointing to the image block data stored in pixels after the process.

By rearranging the image, for certain steps in the process of the color correction, especially for the step of color space transformation, speed of processing image data arranged in pixels is much higher than that of processing image data arranged in color surfaces.

Figure 3:
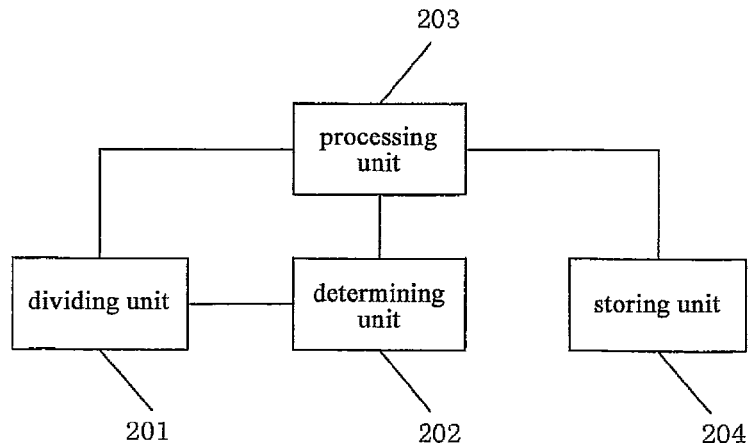
FIG. 3 is a schematic diagram illustrating a structure of a color correction device in accordance with another embodiment of the present invention.

Another embodiment of the present invention provides a device for color correction. As shown in FIG. 3, the device comprises a dividing unit 201, a determining unit 202, a processing unit 203, and a storage unit 204. Wherein, the dividing unit 201 is used for dividing an image into image blocks and sending data of the image blocks to the determining unit 202 and the processing unit 203, and further combining adjacent image blocks to form new image blocks; the determining unit 202 is used for determining whether various color component values of all pixels in a image block are equal, and further determining whether the color component values of the next pixel in a complex block are equal to those of a previous pixel stored in the storage unit 204; the processing unit 203 is used for processing color correction on pixels and storing processing results of the color correction in the storage unit 204. The storage unit 204 is used for storing the results from the process of the color correction on pixels and sending the results to the determining unit 202.

With the above color correction device, a goal of increasing processing speed can be achieved by performing simplified processing for certain image parts with special features, and the processing speed of the color correction can be increased without substantially influencing the present color correction effect.

Obviously, various modifications and variations can be made by those skilled in the art without departing from the spirit and the scope of the present invention. The present invention intends to cover all these modifications and variations if they fall in the scope claimed by the claims of the present invention and their equivalence.

The invention claimed is:
1. A device for color correction, comprising:
at least one unit configured or programmed for:
dividing an input image into no less than one image block;
comparing various color component values of all pixels in each image block with each other, an image block with the same color component values of all pixels being regarded as a simple block, and an image block with different color component values being regarded as a complex block; and
performing a process of the color correction on one pixel of the simple block, then copying a processing result of the color correction to other pixels of the simple block.
2. The device for color correction according to claim 1, wherein the at least one unit is further configured or programmed for:
comparing various color component values of a previous pixel with those of the next pixel in the complex block, and if the values are equal, copying the processing result of the color correction on the previous pixel to the next pixel.
3. The device for color correction according to claim 1, wherein the at least one unit is further configured or programmed for:
if the color component values of the image complex block are stored in color surfaces arrangement, storing the color component values of the image complex block in pixels arrangement.
4. The device for color correction according to claim 1, wherein the width and the height of the image block are equal and are pixels of power of 2.
5. The device for color correction according to claim 1 or 4, wherein adjacent simple blocks with the same color component values are combined into a new simple block, and adjacent complex blocks are combined into a new complex block.
6. The device for color correction according to claim 1, wherein the at least one unit is further configured or programmed for:
after the process of color correction for a previous pixel in the complex block being finished, storing the color component values and the processing result of the color correction;
comparing the color component values of the next pixel with the stored color component values of the previous pixel;
if the values are equal, copying the stored processing result of the color correction on the previous pixel to the next pixel.
7. The device for color correction according to claim 1, wherein the at least one unit is further configured or programmed for:

after the process of color correction for a previous row of pixels in the complex block being finished, storing the color component values and the processing results of the color correction on all these pixels;

comparing various color component values of all pixels in the previous row with those of pixels in the next row at corresponding positions;

if the values are equal, copying the stored processing results of the color correction on the pixels in the previous row to the pixels in the next row at the corresponding positions.

8. The device for color correction according to claim 1, wherein the at least one unit is further configured or programmed for:

after the process of color correction for a previous column of pixels in the complex block being finished, storing the color component values and the processing results of the color correction on all these pixels;

comparing various color component values of all pixels in the previous column with those of pixels in the next column at corresponding positions;

if the values are equal, copying the stored processing results of the color correction on the pixels in the previous column to the pixels in the next column at the corresponding positions.

9. A device for color correction, characterized in that comprising a dividing unit, a determining unit, a processing unit and a storage unit, wherein:

the dividing unit is used for dividing an image into image blocks and sending data of the image blocks to the determining unit and the processing unit;

the determining unit is used for determining whether various color component values of all pixels in a image block are equal, and further for determining whether the color component values of the next pixel in a complex block are equal to color component values of a previous pixel stored in the storage unit;

the processing unit is used for processing color correction on pixels and storing processing results of the color correction in the storage unit;

the storage unit is used for storing the results from the process of the color correction on pixels and sending the results to the determining unit.

10. The device for color correction according to claim 9, characterized in that the dividing unit is further used for combining adjacent image blocks to form new image blocks.

* * * * *

UNITED STATES PATENT AND TRADEMARK OFFICE
CERTIFICATE OF CORRECTION

PATENT NO. : 8,538,146 B2  Page 1 of 1
APPLICATION NO. : 13/255954
DATED : September 17, 2013
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 150 days.

Signed and Sealed this
Fifteenth Day of September, 2015

Michelle K. Lee
*Director of the United States Patent and Trademark Office*